United States Patent
Templeton et al.

(10) Patent No.: US 9,164,560 B2
(45) Date of Patent: Oct. 20, 2015

(54) DAISY CHAIN CONFIGURATION FOR POWER CONVERTERS

(75) Inventors: James Warren Templeton, Austin, TX (US); Scott Kelly Herrington, Cedar Park, TX (US); Gregg Scott Kodra, Austin, TX (US); Paul Walker Latham, II, Lee, NH (US); Stewart Gall Kenly, Epping, NH (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 729 days.

(21) Appl. No.: 13/460,954

(22) Filed: May 1, 2012

(65) Prior Publication Data
US 2013/0293013 A1    Nov. 7, 2013

(51) Int. Cl.
| | |
|---|---|
| H02J 1/00 | (2006.01) |
| G06F 1/26 | (2006.01) |
| H02M 3/156 | (2006.01) |
| H02M 1/00 | (2007.01) |

(52) U.S. Cl.
CPC ............... *G06F 1/266* (2013.01); *H02M 3/156* (2013.01); *H02M 2001/008* (2013.01); *Y10T 307/50* (2015.04); *Y10T 307/615* (2015.04)

(58) Field of Classification Search
CPC ........................................................ H02M 7/10
USPC ............ 326/37, 38, 39, 40, 41, 47, 101, 123; 307/54
See application file for complete search history.

(56) References Cited

U.S. PATENT DOCUMENTS

| | | | |
|---|---|---|---|
| 2011/0012430 A1* | 1/2011 | Cheng et al. ..................... 307/82 |
| 2011/0019748 A1* | 1/2011 | Burns et al. ................... 375/242 |
| 2011/0095601 A1* | 4/2011 | Johansson ...................... 307/9.1 |
| 2012/0321032 A1* | 12/2012 | Liu et al. ......................... 377/26 |

* cited by examiner

*Primary Examiner* — Thienvu Tran
*Assistant Examiner* — David M Stables (57) ABSTRACT

A system includes a plurality of power supplies and a controller. The plurality of power supplies outputs power to a load. A serial bus connects the plurality of power supplies in a daisy chain. The controller is connected to first and last ones of the power supplies by the serial bus. The controller is connected to a management bus via a management bus interface. The controller monitors the plurality of power supplies via the serial bus. The controller transmits status information of the plurality of power supplies to the management bus via the management bus interface of the controller.

19 Claims, 8 Drawing Sheets

DAISY CHAIN CONFIGURATION FOR POWER CONVERTERS

FIELD

The present disclosure relates generally to power supplies and more particularly to monitoring and controlling power supplies using a serial bus.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Integrated circuits (ICs) such as processors typically require power from a plurality of power supplies. Since there are multiple processors (and other ICs) in a given design, there can be multiple power supplies (rails) on a single printed circuit board (PCB). For example, there can be up to 60 power supplies (rails) on a single PCB. Power from the power supplies generally needs to be monitored and controlled. Monitoring and controlling the power supplies typically includes monitoring parameters such as input/output voltages and input/output currents of the power supplies and performing functions such as sequencing. Sequencing a power supply includes determining how to power up, power down, monitor, and reset the power supply. Sequencing can also include fault management.

Generally, the monitoring and controlling is performed using a centralized power-supply controller, monitor, or sequencing IC. The centralized controller may include all or part of a field-programmable gate array (FPGA), a programmable logic device (PLD), an Application Specific Integrated Circuit (ASIC), or a microcontroller (MCU). The centralized controller can monitor and control the power supplies via inter-integrated circuit (I2C) or system management bus (SMBus) sometimes using a power management bus (PM-Bus) protocol.

The wiring and cost overheads associated with these systems render them unsuitable for use with low-cost, low-power power supplies. For example, when an FPGA, a PLD, or a sequencing/supervisor IC is used to manage individual rails in a power sub-system, such a system is not scalable and is inflexible to design changes. Each sequencing/supervisor IC is generally selected according to a number of power rails in a particular design. Such a system also requires routing of sense nodes across a printed circuit board (PCB), which is subject to noise pick-up and therefore errors.

SUMMARY

A system comprises a plurality of power supplies and a controller. The plurality of power supplies outputs power to a load or a plurality of loads. For example, the system can include multiple power supplies powering a single load (IC) or a single power supply powering multiple loads (ICs). A serial bus connects the plurality of power supplies in a daisy chain. The sequencer module is connected to first and last ones of the power supplies by the serial bus. The controller is connected to a management bus via a management bus interface. For example, the management bus can include any suitable bus such as a system management bus (SMBus), a serial peripheral interface (SPI) bus, or an Inter-IC (I2C) bus. Accordingly, the management bus interface can include an interface suitable for the type of management bus used. The controller monitors the plurality of power supplies via the serial bus. The controller transmits status information of the plurality of power supplies to the management bus via the management bus interface of the controller.

A method comprises supplying power to a load from a plurality of power supply modules connected in a daisy chain by a serial bus. The method further comprises monitoring the plurality of power supplies using a controller connected to first and last ones of the power supplies by the serial bus. The method further comprises transmitting status information of the plurality of power supplies from the controller to a management bus via a management bus interface of the controller.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure relates to systems and methods for monitoring and controlling power supplies that allow for a single serial bus connection to be shared among several low-cost power supplies by using a daisy-chain serial bus connection to link the individual power supplies to a centralized controller. Each power supply is called a satellite, and the centralized controller is called a mothership. The use of the serial bus makes the systems robust, noise immune, and scalable. The mothership can be implemented as a digital integrated circuit (IC) and can be incorporated in an Application Specific Integrated Circuit (ASIC), a field-programmable gate array (FPGA), and so on.

Figure 1:
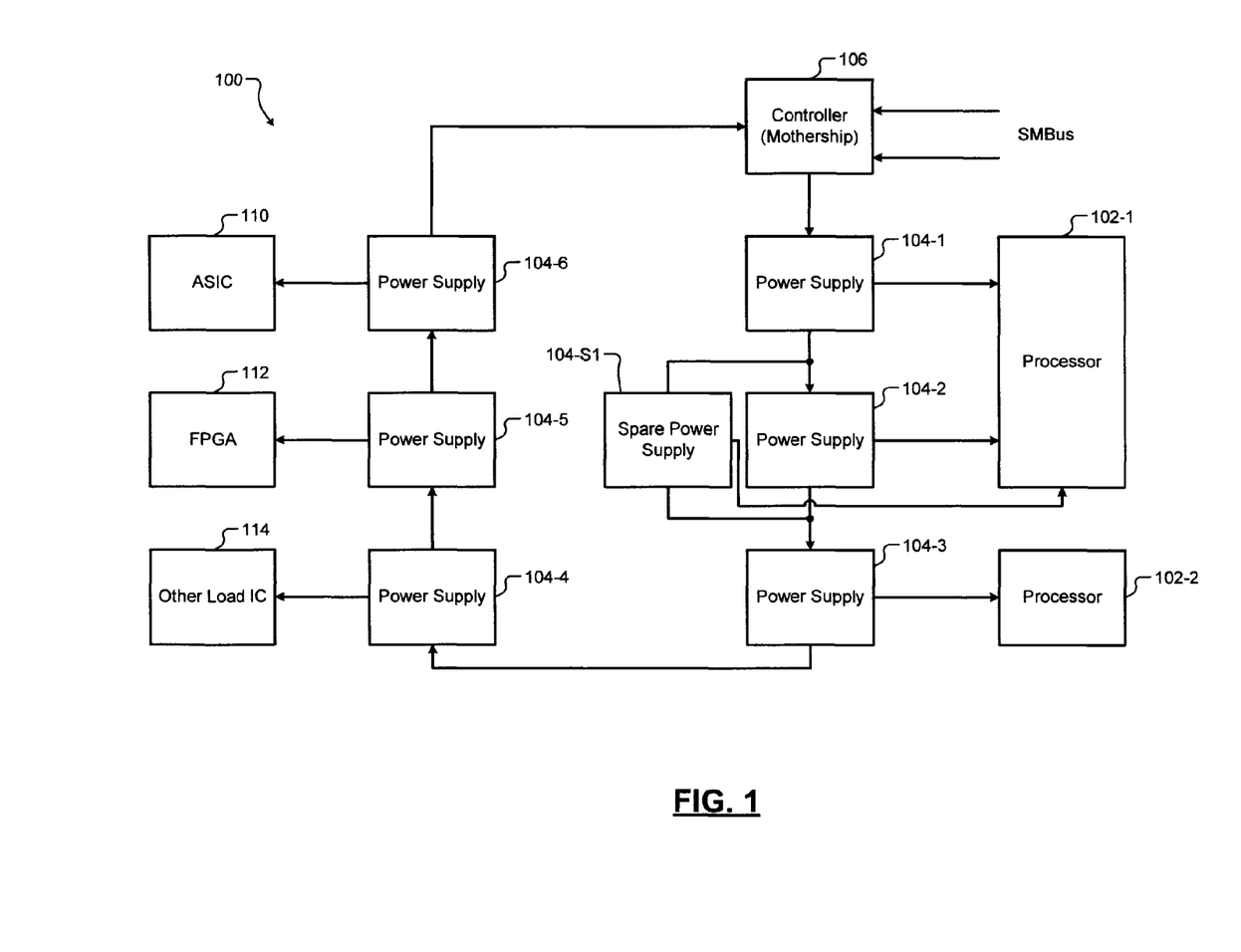
FIG. 1 is a functional block diagram of a system for monitoring and controlling a plurality of power supplies connected in a daisy chain via a serial bus.
Figure 2:
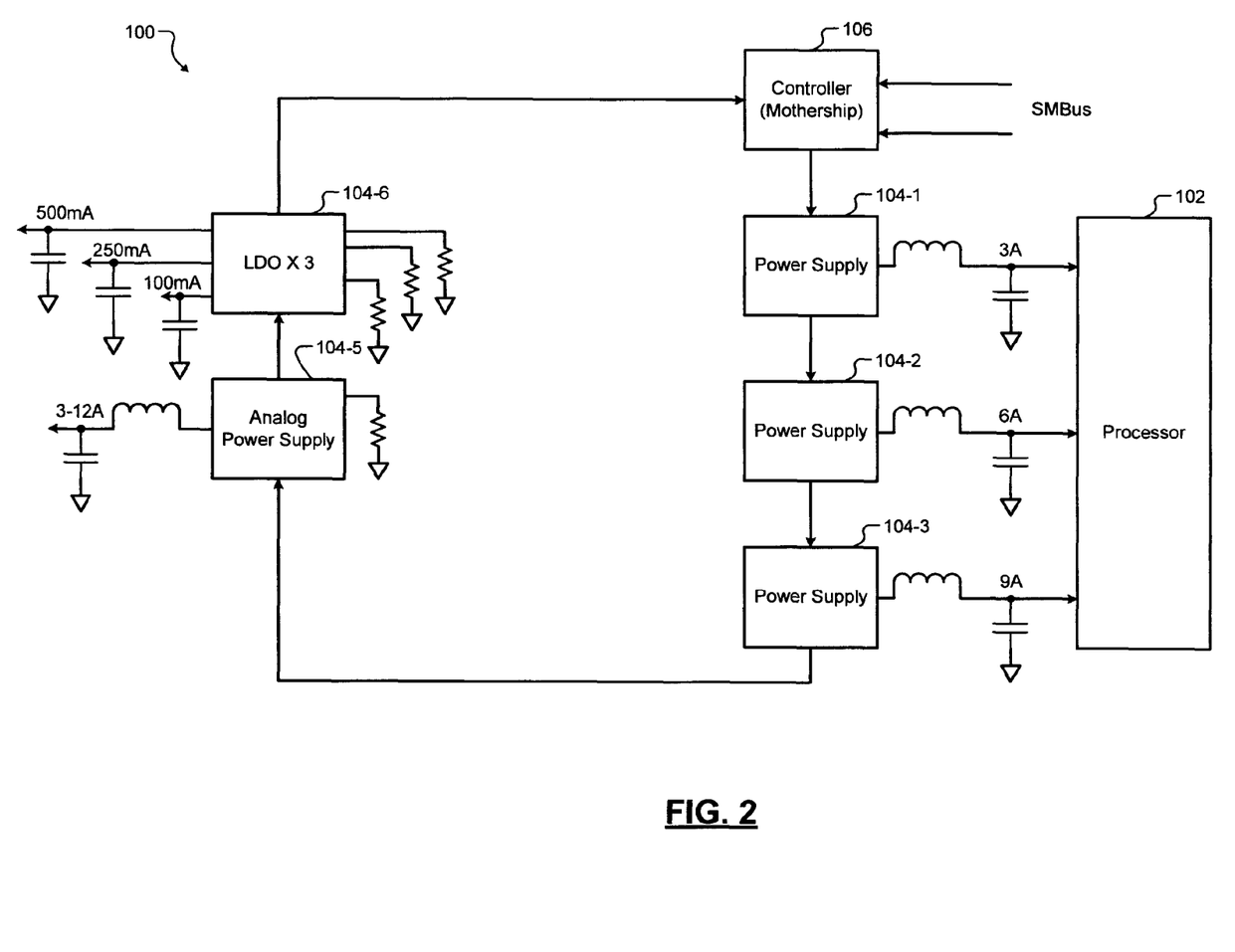
FIG. 2 is an example of the system of FIG. 1 including different types of power supplies.

Referring now to FIGS. 1 and 2, an example of a system 100 for monitoring and controlling power supplies according to the present disclosure is shown. The system 100 includes a plurality of load ICs and a plurality of power supplies. The plurality of load ICs may include processors 102-1, 102-2, etc. (collectively processors 102), an application specific IC (ASIC) 110, a field-programmable gate-array (FPGA), and other load IC 114 that receive power from the plurality of power supplies 104-1, 104-2, . . . , and 104-6 (collectively power supplies 104). While only six power supplies are shown in the example, the system 100 may include any number of power supplies. Similarly, the processors 102, the ASIC 110, the FPGA 112, and the other load IC 114 are only examples of the load ICs. The load ICs may include fewer ICs or may include additional ICs such as memory ICs. Further, a plurality of load ICs can receive power from a single power supply or a single load IC can receive power from a plurality of power supplies.

The power supplies 104 are daisy chained to a controller 106 via a serial bus. The controller 106 connects to the SMBus and interfaces the power supply modules 104 to the SMBus via a SMBus interface. Accordingly, none of the power supplies 104 needs to include an interface to individually communicate with the SMBus. For example only, the SMBus may use a PMBus command set or a PMBus protocol. Throughout the disclosure, the SMBus and the SMBus interface are used only as examples of a management bus and a corresponding interface. Instead, any other types of management buses and corresponding interfaces may be used. Examples of the management buses include system management bus (SMBus), serial peripheral interface (SPI) bus, or Inter-IC (I2C) bus. The controller 106 monitors and controls the power supplies 104 as explained below.

The power supplies 104 may include different types of power supplies. For example, in FIG. 2, the power supplies 104-1 through 104-3 may include digital auto-compensated DC-to-DC converters that auto-compensate by measuring external components (e.g., inductance, capacitance) at startup. The power supplies 104-1 through 104-3 may respectively supply currents of 3A, 6A, and 9A, for example. The power supply 104-5 may include an analog power supply capable of supplying currents from 3A to 12A, for example. The power supply 104-6 may include three low-dropout (LDO) regulators capable of supplying currents of 100 mA, 250 mA, and 500 mA, for example. One or more of the power supplies 104 may include switches (e.g., transistors), a clock generator, and a pulse width modulation (PWM) module used to generate PWM pulses to drive the switches.

When power to the system 100 is turned on, the controller 106 can perform the following functions before issuing a power-on reset (POR) to the load IC 102. For example, the controller 106 can count the power supplies 104 in the daisy chain. For example, the controller 106 can transmit a signal via the serial bus to the power supply 104-1, which is the first power supply in the daisy chain. The power supply 104-1 can perform a self-test and transmit a status signal via the serial bus to the controller 106. The status signal may indicate a status of the power supply 104-1 (e.g., whether the power supply 104-1 passed the self-test and can function normally).

In some implementations, the power supply 104-1 may not transmit a status signal to the controller 106. Instead, the power supply 104-1 may include the status in a signal transmitted by the power supply 104-1 to the power supply 104-2 via the serial bus.

In some implementations, the power supplies 104 may be self-addressing. For example, the power supply 104-1 may assign itself an address of 01 on receiving the signal from the controller 106. Accordingly, the status signal transmitted by the power supply 104-1 to the controller 106 (and/or the power supply 104-2) may include the address and/or the status of the power supply 104-1. Alternatively, the signal transmitted by the controller 106 may assign an address 01 to the power supply 104-1. The assignment may or may not be conditioned based on whether the power supply 104-1 passes a self-test and can function normally.

The power supply 104-1 may pass the signal received from the controller 106 (or may generate and transmit a signal) to the power supply 104-2 via the serial bus. The power supply 104-2 can perform a self-test and transmit a status signal to the power supply 104-1 via the serial bus. The power supply 104-1 may pass the status signal received from the power supply 104-2 to the controller 106. The status signal may indicate a status of the power supply 104-2 (e.g., whether the power supply 104-2 passed self-test and can function normally).

In some implementations, the power supply 104-2 may not transmit a status signal to the power supply 104-1. Instead, the power supply 104-2 may include the status in a signal transmitted by the power supply 104-2 to the power supply 104-3 via the serial bus.

The power supply 104-2 may assign itself an address of 02 on receiving the signal transmitted by the power supply 104-1. Accordingly, the status signal transmitted by the power supply 104-2 to the power supply 104-1 (and/or the power supply 104-3) may include the address and the status of the power supply 104-2. Alternatively, the signal transmitted by the power supply 104-1 may assign an address 02 to the power supply 104-2. The assignment may or may not be conditioned based on whether the power supply 104-2 passes self-test and can function normally.

The procedure is performed by the remaining power supplies in the daisy chain. The controller 106 may generate a power-on reset (POR) for the system 100 on receiving the status signal from the last power supply in the daisy chain indicating that all of the power supplies 104 passed the self-test and can function properly.

The controller 106 determines the amount of time elapsed from the time of transmission of the signal to the power supply 104-1 to the time of reception of the status signal from the last power supply in the daisy chain. For notational convenience, this time may be called maximum loop time. Based on the maximum loop time and the status signal received from the last power supply in the daisy chain, the controller 106 can perform many operations. Some examples of the operations are described below.

The controller 106 can determine the number of power supplies 104 in the daisy chain. The controller 106 can spread the switch clocks of each power supply 104 across a switch clock period (e.g., 360°/N where N=number of power supplies 104).

The controller 106 can determine a time-out period based on the maximum loop time and use the time-out period to detect an open circuit in the daisy chain (e.g., due to a bad connection). For example, the controller 106 can set the time-out period to be greater than or equal to the maximum loop time. The controller 106 can periodically transmit a ping signal through the daisy chain. The controller 106 can detect a fault in the daisy chain if the ping signal is not received from the last power supply in the daisy chain before the time-out period expires (i.e., within the maximum loop time).

In some implementations, the controller 106 can determine which of the power supplies 104 is faulty and activate a spare power supply if the spare power supply is available. For example, a spare power supply may be connected in parallel to one or more of the power supplies 104. For example, a spare power supply 104-S1 may be connected in parallel to the power supply 104-2 as in FIG. 1. A spare power supply is redundant to the main power supply with which it is connected in parallel. For example, the spare power supply 104-S1 is identical to the power supply 104-2. In some implementations, the spare power supply 104-S1 is always active and supplies one or more voltages. The spare power supply may be removed from service upon failure. While only one power supply is shown to have a spare power supply in FIG. 1, additional power supplies may have corresponding spare power supplies. The spare power supply may be tested when power is turned on and deactivated if a corresponding main power supply passed the self-test. The spare power supply may be activated when the main power supply fails.

The controller 106 can perform a plurality of power management functions including sequencing the power supplies 104 on or off in an order that is independent of a physical order in which the power supplies 104 are connected in the daisy chain. The controller 106 can also use the addresses or a portion of addresses of the power supplies 104 to indicate high-priority (e.g., faults) so that latency through the daisy chain can be minimized without requiring a high-speed serial bus. In this example, if a high priority bit or bits are set in the address field of a message, subsequent supplies in the daisy chain will ignore the message received from a power supply and pass the message on to the next power supply. For example, to indicate a high-priority message, first N bits of the packet may be set indicating that the message is a high-priority broadcast message. A power supply receiving the message decodes the first N bits. If the message is a high-priority message, the message is passed on to the next power supply.

The controller 106 can monitor input voltages ($V_{in}$) of the power supplies 104 remotely and can measure duty cycles (D) of the power supplies 104 through the serial bus connection. The controller 106 also includes an internal voltage reference or receives an external voltage reference. The voltage reference provides a measure of voltage independent of voltages generated by the power supplies 104. The controller 106 can calculate output voltages ($V_{out}$) of the power supplies 104 using the relation $V_{out} \approx D \times V_{in} \times \alpha$, where $\alpha$ is the efficiency of a respective power supply. The efficiencies of the power supplies can be characterized, measured, or assumed based on system design and measurement. Based on this information, the controller 106 can provide an independent measure of output regulation voltage of the power supplies 104 to a system supervisor via the SMBus.

Figure 3:
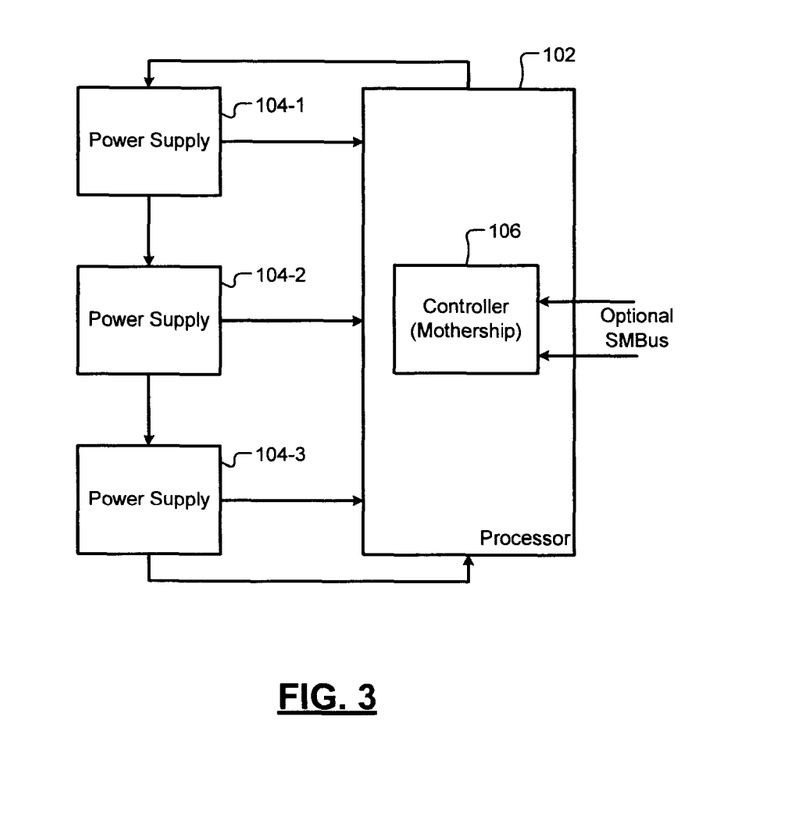
FIG. 3 is a functional block diagram of a system for monitoring and controlling power supplies wherein a sequencer module of the system is integrated in a load of the system.
Figure 4:
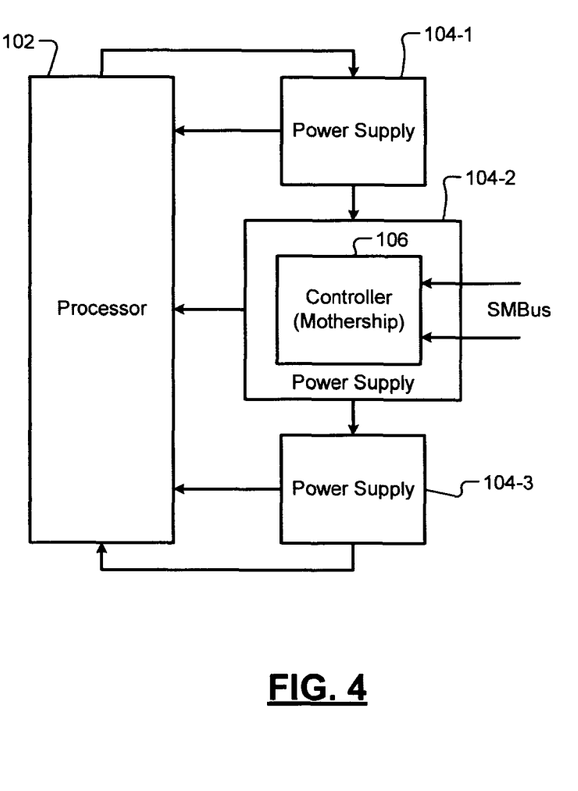
FIG. 4 is a functional block diagram of a system for monitoring and controlling power supplies wherein a sequencer module of the system is integrated in one of the power supply modules of the system.
Figure 5:
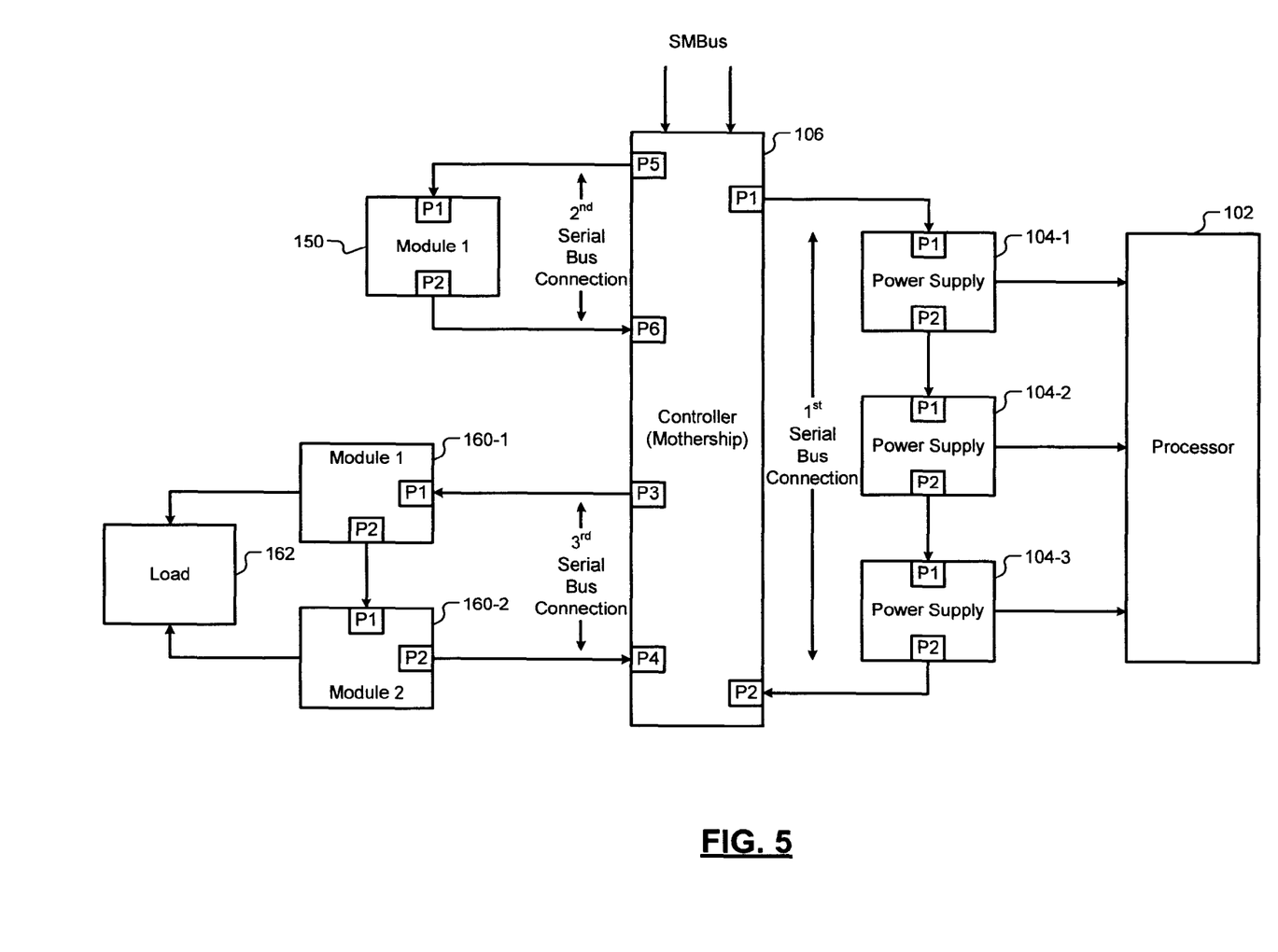
FIG. 5 is a functional block diagram of a system for monitoring and controlling power supplies wherein a sequencer module of the system includes a plurality of serial ports.

Referring now to FIGS. 3-5, different implementations of the system 100 are shown. For example, in some implementations, a separate controller 106 may not be used. Instead, as shown in FIG. 3, the controller 106 may be incorporated in the load IC 102. Alternatively, as shown in FIG. 4, one of the supply modules 104 may implement the controller 106.

In FIG. 5, the controller 106 may include additional serial bus connections to modules that are not in the daisy chain comprising the power supplies 104. One or more of the additional serial bus connections may be associated with respective daisy chains and may be used to communicate with a plurality of modules in the respective daisy chains. The controller 106 may still include only one interface to communicate with the SMBus. For example, the controller 106 may communicate with the power supplies 104 via a first serial bus connection; a module 150 via a second serial bus connection; and modules 160-1 and 160-2, which supply power to a load 162, via a third serial bus connection.

Each serial bus connection utilizes two serial bus ports of the controller 106. For example, the first serial bus connection utilizes serial bus ports P1 and P2; the second serial bus connection utilizes serial bus ports P3 and P4; and so on. Each module in a serial bus connection includes two serial bus ports. For example, each of the power supplies 104 includes serial bus ports P1 and P2. The serial bus ports are described below in detail with reference to FIGS. 8 and 9.

Figure 6:
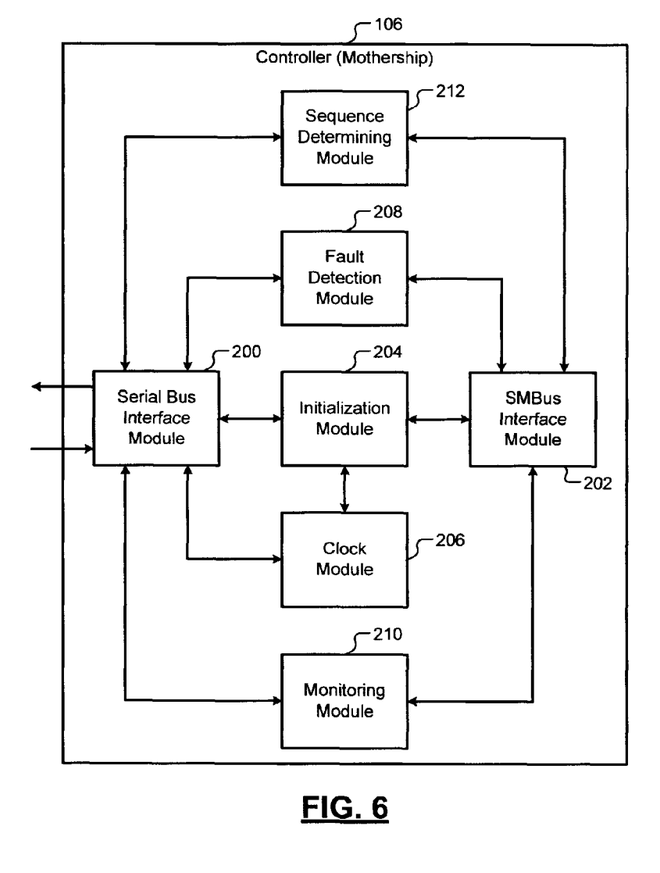
FIG. 6 is a functional block diagram of a sequencer module of the system of FIG. 1.

Referring now to FIG. 6, the controller 106 is shown in detail. The controller 106 comprises a serial bus interface module 200, a SMBus interface module 202, an initialization module 204, a clock module 206, a fault detection module 208, a monitoring module 210, and a sequence determining module 212. The term "module" as used herein is specifically defined below. The serial bus interface module 200 communicates with the power supplies 104 via the serial bus. The serial bus interface module 200 may include multiple serial bus ports. Each serial bus port may communicate with a different set of modules connected by the serial bus in a separate daisy chain.

The SMBus interface module 202 communicates with a SMBus. The SMBus interface module 202 communicates the statuses of the power supplies 104 (and statuses of modules connected via the serial bus ports) to a system supervisor via the SMBus. The SMBus interface module 202 interprets PMBus commands and communicates with different modules via the serial bus ports. Accordingly, the different modules need not individually include a SMBus interface.

The initialization module 204 transmits an initialization signal through each serial port. The initialization signal is received by a first module connected to each serial port. The initialization signal triggers a self-test of the first module. The first module may return a status of the self-test and an address of the first module to the initialization module 204. Alternatively, the first module may transmit the initialization signal along with the status and/or address of the first module to a second module in the daisy chain, and so on, until a last module returns a status signal to the initialization module 204. In some implementations, performing the self-test and transmitting the status may be optional.

The initialization module 204 determines a number of modules in the daisy chain based on information received in the status signal. The initialization module 204 determines a time-out period for the daisy chain based on the time between transmission of the initialization signal to the first module in the daisy chain and reception of the status signal from the last module in the daisy chain. The initialization module 204 reports the status of the modules in the daisy chain to the system supervisor via the SMBus interface module 202.

The clock module 206 may spread the switch clock phase alignment of each of the power supplies in the daisy chain across a switch clock period based on the number of power supplies in the daisy chain. The clock module 206 sends the clock data to the power supplies in the daisy chain via the serial bus port.

The fault detection module 208 periodically transmits a ping message through the daisy chain. Each module in the daisy chain appends the ping message with the address and/or status information of the respective module and transmits the appended ping message to the next module in the daisy chain. The fault detection module 208 detects a fault in the daisy chain if the ping message is not returned by the last module in the daisy chain within the time-out period. The fault detection module 208 reports the fault, including identification of the faulty module in the daisy chain, to the system supervisor via the SMBus interface module 202. Additionally, the fault detection module 208 may transmit a control signal through the serial bus to deactivate the faulty power supply and to activate an alternate power supply if the alternate power supply is connected in parallel to the faulty power supply.

The monitoring module 210 monitors input voltages ($V_{in}$) and measures duty cycles (D) of the power supplies in the daisy chain through the serial bus connection. The monitoring module 210 may include an internal voltage reference or receive an external voltage reference, which provides a measure of voltage independent of voltages generated by the power supplies. The monitoring module 210 calculates output voltages ($V_{out}$) of the power supplies using the relation $V_{out} \approx D \times V_{in} \approx \alpha$, where $\alpha$ is the efficiency of a respective power supply. The efficiencies of the power supplies can be characterized, measured, or assumed based on system design and measurement. Based on this information, the monitoring module 210 provides an independent measure of the regulation voltage of the power supplies to the system supervisor via the SMBus interface module 202.

The sequence determining module 212 sequences the power supplies on or off in an order that is independent of a physical order in which the power supplies are connected in the daisy chain. The sequence determining module 212 can also use an address or a portion of the address of a power supply to indicate high-priority (e.g., a fault) so that latency through the daisy chain can be minimized without requiring a high-speed serial bus.

Figure 7:
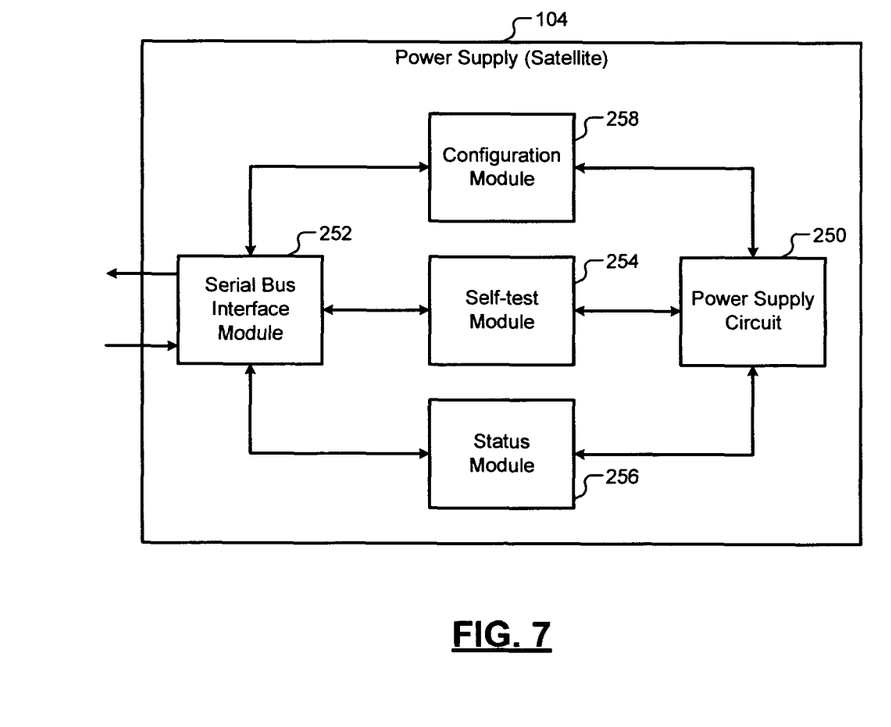
FIG. 7 is a functional block diagram of a power supply module of the system of FIG. 1.

Referring now to FIG. 7, a power supply 104 is shown in detail. The power supply 104 includes a power supply circuit 250, a serial bus interface module 252, a self-test module 254, a status module 256, and a configuration module 258. The power supply circuit 250 may supply one or more voltages/currents. The serial bus interface module 252 communicates with adjacent modules via the serial bus. Accordingly, the serial bus interface module 252 includes two serial bus ports. The adjacent modules may include either two power supplies or a power supply and the controller 106.

The self-test module 254 performs a self-test of the power supply circuit 250 when an initialization signal is received from the controller 106. The configuration module 258 assigns an address to the power supply 104 when the initialization signal is received from the controller 106. The self-test module 254 returns results of the self-test to the serial bus interface module 252. The serial bus interface module 252 appends the initialization signal with the status and the address of the power supply 104 and transmits the appended signal to the adjacent module.

The status module 256 appends the ping message received from the controller 106 with the status of the power supply circuit 250. The status module 256 also supplies other data such as input/output voltages and currents, and duty cycle of clock signals of switches of the power supply circuit 250 to the controller 106. The ping message is independent of any other communication. During normal steady-state operation, there should be no traffic on the serial bus. This is why the ping message is used so that the serial bus is normally inactive and is busy only when the ping message is used periodically or on receiving a command from the SMBus. The ping message tests the inactive bus before there is a need to report any fault that may occur sometime in the future. Since the system works even if the loop formed by the serial bus fails, there is no need to have ongoing traffic on the serial bus to check for failures and/or normal operation. Accordingly, using the ping messages and keeping the serial bus mostly inactive saves power.

The configuration module 258 configures parameters such as duty cycle of the clock signals of switches of the power supply 250 according to signals received from the controller 106. The configuration module 258 also activates/deactivates the power supply 250 based on signals received from the controller 106. For example, the configuration module 258 deactivates the power supply 250 based on a control signal received from the controller 106 when the power supply 250 is faulty. The configuration module 258 activates the power supply 250 based on a control signal received from the controller 106 when the power supply 104 is a spare connected in parallel to one of the power supplies that is determined to be faulty.

Figure 8:
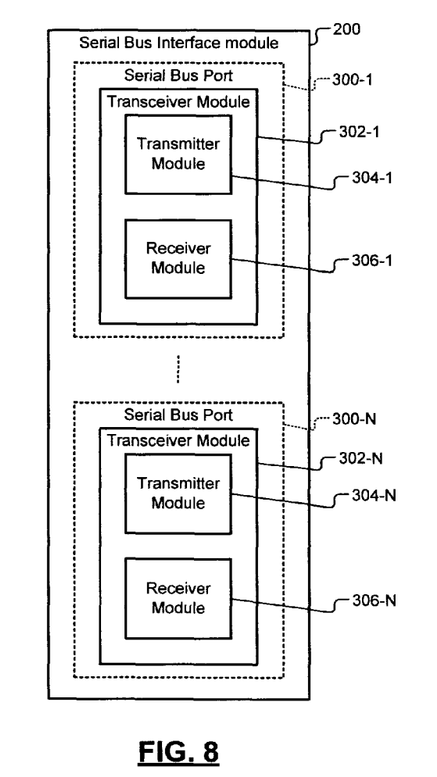
FIG. 8 is a functional block diagram of a serial bus interface module of the sequencer module of FIG. 6.

Referring now to FIG. 8, the serial bus interface module 200 of the controller 106 is shown in detail. The serial bus interface module 200 comprises a plurality of serial bus ports 300-1, . . . , and 300-N (collectively serial bus ports 300), where N is an integer greater than 1. Each serial bus port 300 includes a transceiver, which in turn includes a transmitter module and a receiver module. For example, the serial bus port 300-1 includes a transceiver module 302-1, which in turn includes a transmitter module 304-1 and a receiver module 306-1. The serial bus ports 300 may be compatible with any suitable serial bus such as I2C, SMBus, SPI, etc. The serial bus ports 300 may transmit and receive signals including packets. The packets may include data that is modulated, coded, encrypted, and so on.

Figure 9:
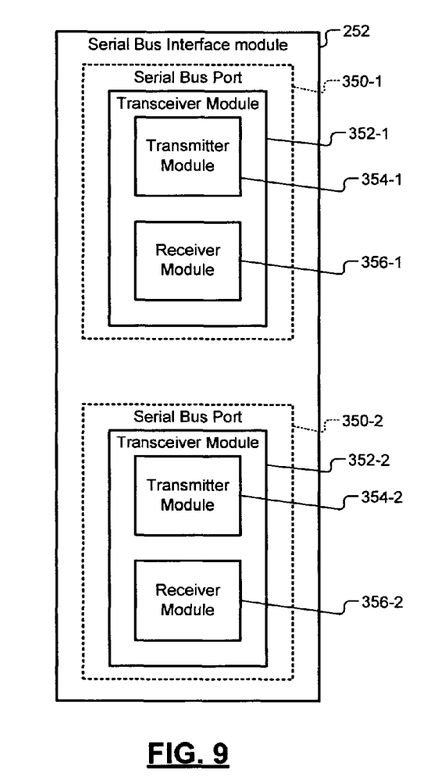
FIG. 9 is a functional block diagram of a serial bus interface module of the power supply module of FIG. 7.

Referring now to FIG. 9, the serial bus interface module 252 of the power supplies 104 is shown in detail. The serial bus interface module 252 comprises two serial bus ports 350-1 and 350-2 (collectively serial bus ports 350). Each serial bus port 300 includes a transceiver, which in turn includes a transmitter module and a receiver module. For example, the serial bus port 350-1 includes a transceiver module 352-1, which in turn includes a transmitter module 354-1 and a receiver module 356-1. The serial bus ports 350 may be compatible with any suitable serial bus such as universal serial bus I2C, SMBus, SPI etc. The serial bus ports 350 may transmit and receive signals including packets. The packets may include data that is modulated, coded, encrypted, and so on.

Figure 10:
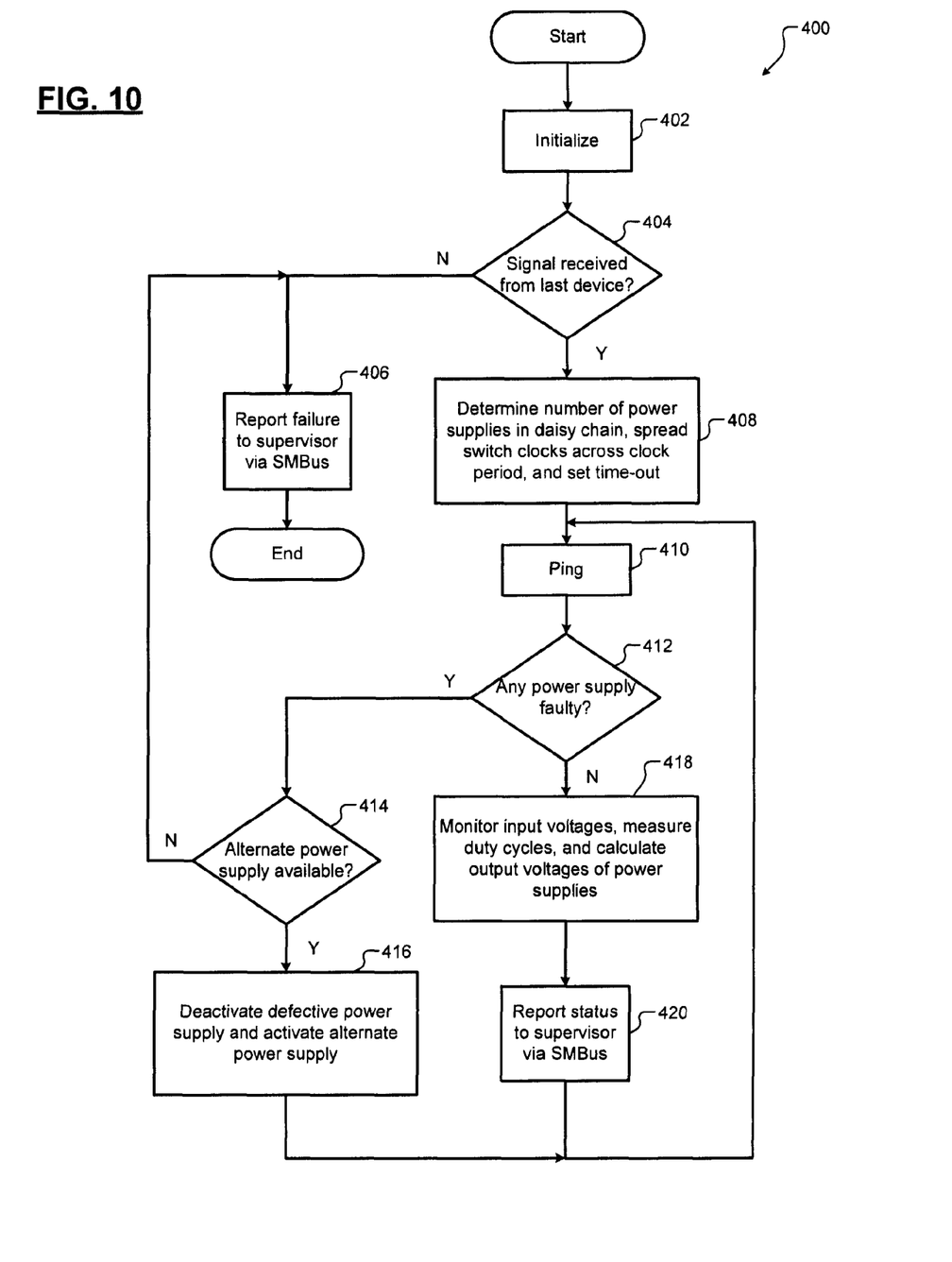
FIG. 10 is a flowchart of a method for monitoring and controlling power supplies connected in a daisy chain via a serial bus.

Referring now to FIG. 10, a method 400 for monitoring and controlling power supplies according to the present disclosure is shown. At 402, control initializes a plurality of power supplies connected in a daisy chain via a serial bus. One power supply receives the initialization signal, assigns itself an address, performs a self-test, appends the initialization signal with the address and the result of the self-test, and transmits the appended signal to a next power supply. The procedure is performed by the remaining power supplies in the daisy chain, and the last power supply in the daisy chain transmits an appended signal.

At 404, control determines if the appended signal from the last power supply mode in the daisy chain is received. At 406, if the appended signal from the last power supply mode in the daisy chain is not received, control reports a failure to a system supervisor via the SMBus. For example, control reports the failure to a remote device connected to the SMBus.

At 408, if the appended signal from the last power supply in the daisy chain is received, control determines a number of power supplies in the daisy chain from the addresses included in the appended signal. Additionally, control spreads switch clocks of the power supplies across a clock period, and determines a time-out period for ping signals.

At 410, control pings the power supplies in the daisy chain. At 412, control determines if any of the power supplies in the daisy chain are faulty based on whether the ping is returned by the last power supply in the daisy chain in less than or equal to the time-out period.

At 414, if any of the power supplies in the daisy chain are faulty, control determines if any alternate power supply is connected in parallel to the faulty power supply. Control can determine this from addresses included in the appended signal received from the last power supply mode in the daisy chain at initialization. Control returns to 406 if no alternate power supply is connected in parallel to the faulty power supply. At 416, if an alternate power supply is connected in parallel to the faulty power supply, control transmits a signal via the serial bus to deactivate the faulty power supply and activate the alternate power supply, and control returns to 410.

At 418, if none of the power supplies in the daisy chain is faulty, control monitors input voltages and measures duty cycles of the power supplies via the serial bus and calculates output voltages of the power supplies based on the input voltages and the duty cycles. At 420, control reports statuses of the power supplies to the system supervisor via the SMBus. For example, control reports the statuses to a remote device connected to the SMBus.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
 a plurality of power supplies that supply power to respective loads;
 a serial bus that connects the plurality of power supplies in a daisy chain; and
 a controller that is connected to first and last ones of the power supplies by the serial bus, that is connected to a management bus via a management bus interface, that monitors the plurality of power supplies via the serial bus, and that transmits status information of the plurality of power supplies to the management bus via the management bus interface of the controller, wherein the serial bus is different than the management bus, wherein the controller comprises a fault detection module that transmits a ping signal to the first one of the plurality of power supplies via the serial bus and that determines that one of the plurality of power supplies is faulty if a response to the ping signal is not received from the last one of the plurality of power supplies via the serial bus within a time-out period after transmitting the ping signal.

2. The system of claim 1 wherein each of the plurality of power supplies communicates with the management bus via the management bus interface of the controller.

3. The system of claim 1 wherein the controller is integrated in one of the plurality of power supplies.

4. The system of claim 1, wherein:
 each of the plurality of power supplies includes two serial bus ports;
 the controller includes two serial bus ports;
 a first one of the two serial bus ports of the controller is connected by the serial bus to a first one of the two serial bus ports of the first one of the plurality of power supplies;
 a second one of the two serial bus ports of each of the plurality of power supplies except the last one of the plurality of power supplies is connected by the serial bus to a first one of the two serial bus ports of an adjacent one of the plurality of power supplies in the daisy chain; and
 a second one of the two serial bus ports of the controller is connected by the serial bus to a second one of the two serial bus ports of the last one of the plurality of power supplies.

5. The system of claim 1 wherein the controller comprises a sequence determining module that transitions the plurality of power supplies on and off via the serial bus independently of an order in which the plurality of power supplies is physically connected in the daisy chain.

6. The system of claim 1 wherein the controller comprises an initialization module that transmits an initialization signal to the plurality of power supplies via the serial bus and that receives a status signal from the last one of the plurality of power supplies via the serial bus indicating a number of the plurality of power supplies in the daisy chain.

7. The system of claim 6 wherein:
 the controller comprises a clock module that determines a configuration of clock signals of the plurality of power supplies based on the number of the plurality of power supplies in the daisy chain and that transmits the configuration to the plurality of power supplies via the serial bus; and
 each of the plurality of power supplies includes a configuration module that configures the clock signals of switches of the respective one of the plurality of power supplies based on the configuration received from the clock module via the serial bus.

8. The system of claim 1 wherein the controller comprises:
an initialization module that determines the time-out period based on a time difference between transmitting a first signal to a first one of the plurality of power supplies via the serial bus and, in response, receiving a second signal from the last one of the plurality of power supplies via the serial bus; and a fault detection module that transmits a ping signal to the first one of the plurality of power supplies via the serial bus and that determines that one of the plurality of power supplies is faulty if a response to the ping signal is not received from the last one of the plurality of power supplies via the serial bus within a time-out period after transmitting the ping signal.

9. The system of claim 1 further comprising:
a spare power supply module connected in parallel to the one of the plurality of power supplies,
wherein, if the one of the plurality of power supplies is faulty, the fault detection module deactivates the one of the plurality of power supplies and activates the spare power supply by transmitting a control signal via the serial bus to the one of the plurality of power supplies and the spare power supply.

10. The system of claim 1 wherein the controller comprises a monitoring module that:
monitors an input voltage of one of the plurality of power supplies via the serial bus;
measures a duty cycle of the one of the plurality of power supplies via the serial bus; and
calculates an output voltage of the one of the plurality of power supplies based on the input voltage and the duty cycle.

11. The system of claim 1 wherein:
the controller comprises an initialization module that transmits an initialization signal to the plurality of power supplies via the serial bus; and
each of the plurality of power supplies comprises a configuration module that assigns an address to a respective one of the plurality of power supplies when the respective one of the plurality of power supplies receives the initialization signal.

12. A method comprising:
supplying power to a plurality of loads respectively from a plurality of power supplies connected in a daisy chain by a serial bus;
monitoring the plurality of power supplies using a controller connected to first and last ones of the power supplies by the serial bus;
transmitting status information of the plurality of power supplies from the controller to a management bus via a management bus interface of the controller,
wherein the serial bus is different than the management bus; transmitting a ping signal from the controller to the first one of the plurality of power supplies via the serial bus; and determining that one of the plurality of power supplies is faulty if a response to the ping signal is not received from the last one of the plurality of power supplies via the serial bus within a time-out period after transmitting the ping signal.

13. The method of claim 12 further comprising sequencing the plurality of power supplies via the serial bus independently of an order in which the plurality of power supplies is physically connected in the daisy chain.

14. The method of claim 12 further comprising transmitting from the controller an initialization signal to the plurality of power supplies via the serial bus and receiving a status signal from the last one of the plurality of power supplies via the serial bus indicating a number of the plurality of power supplies in the daisy chain.

15. The method of claim 14 further comprising:
determining a configuration of clock signals of the plurality of power supplies based on the number of the plurality of power supplies in the daisy chain;
transmitting the configuration from the controller to the plurality of power supplies via the serial bus; and
configuring the clock signals of the plurality of power supplies based on the configuration received from the controller via the serial bus.

16. The method of claim 12 further comprising:
determining the time-out period based on a time difference between transmitting a first signal from the controller to a first one of the plurality of power supplies via the serial bus and, in response, receiving a second signal from the last one of the plurality of power supplies via the serial bus; transmitting a ping signal from the controller to the first one of the plurality of power supplies via the serial bus; and determining that one of the plurality of power supplies is faulty if a response to the ping signal is not received from the last one of the plurality of power supplies via the serial bus within a time-out period after transmitting the ping signal.

17. The method of claim 12 further comprising, if the one of the plurality of power supplies is faulty:
deactivating the one of the plurality of power supplies; and
activating a spare power supply connected in parallel to the one of the plurality of power supplies by transmitting a control signal via the serial bus.

18. The method of claim 12 further comprising:
monitoring an input voltage of one of the plurality of power supplies via the serial bus;
measuring a duty cycle of the one of the plurality of power supplies via the serial bus; and
calculating an output voltage of the one of the plurality of power supplies based on the input voltage and the duty cycle.

19. The method of claim 12 wherein:
transmitting from the controller an initialization signal to the plurality of power supplies via the serial bus; and
assigning an address to one of the plurality of power supplies when the one of the plurality of power supplies receives the initialization signal.

* * * * *

UNITED STATES PATENT AND TRADEMARK OFFICE
CERTIFICATE OF CORRECTION

Page 1 of 1

PATENT NO. : 9,164,560 B2
APPLICATION NO. : 13/460954
DATED : October 20, 2015
INVENTOR(S) : James Warren Templeton et al.

It is certified that error appears in the above-identified patent and that said Letters Patent is hereby corrected as shown below:

In the Claims:

Column 11, Lines 7-14, Claim 8  Delete "bus; and a fault detection module that transmits a ping signal to the first one of the plurality of power supplies via the serial bus and that determines that one of the plurality of power supplies is faulty if a response to the ping signal is not received from the last one of the plurality of power supplies via the serial bus within a time-out period after transmitting the ping signal" and insert --bus.--

Column 12, Lines 29-35, Claim 16  Delete "bus; transmitting a ping signal from the controller to the first one of the plurality of power supplies via the serial bus; and determining that one of the plurality of power supplies is faulty if a response to the ping signal is not received from the last one of the plurality of power supplies via the serial bus within a time-out period after transmitting the ping signal." and insert --bus.--

Signed and Sealed this
Twenty-third Day of February, 2016

Michelle K. Lee
*Director of the United States Patent and Trademark Office*